United States Patent [19]
Ocampo

[11] Patent Number: 6,030,078
[45] Date of Patent: Feb. 29, 2000

[54] COLORED CONTACT LENSES THAT CHANGE THE APPEARANCE OF THE IRIS TO OLIVE GREEN

[75] Inventor: Gerardo Ocampo, Bridgeview, Ill.

[73] Assignee: Wesley Jessen Corporation, Des Plaines, Ill.

[21] Appl. No.: 09/148,185

[22] Filed: Sep. 4, 1998

[51] Int. Cl.$^7$ ....................................................... G02C 7/04
[52] U.S. Cl. ............................................. 351/162; 351/177
[58] Field of Search ........................... 351/160 R, 160 H, 351/161, 162, 177

[56] References Cited

U.S. PATENT DOCUMENTS 5,120,121  6/1992  Rawlings et al. ......................... 351/162
5,414,477  5/1995  Jahnke ..................................... 351/162
5,936,705  8/1999  Ocampo et al. ......................... 351/162

*Primary Examiner*—Scott J. Sugarman
*Attorney, Agent, or Firm*—Brinks Hofer Gilson & Lione

[57] ABSTRACT

A colored contact lens comprising a non-opaque pupil section, an iris section surrounding the pupil section, and a colored, opaque, intermittent patter over the iris section. The pattern having elements which are indiscernible to the ordinary viewer. The elements of the pattern are a color which provides a contact lens capable of making change or modifications to the appearance of the color of the iris to a striking olive green color, while importing a very natural appearance.

41 Claims, 2 Drawing Sheets

COLORED CONTACT LENSES THAT CHANGE THE APPEARANCE OF THE IRIS TO OLIVE GREEN

TECHNICAL FIELD

The present invention relates to colored contact lenses, and in particular to color contact lenses having opaque colored portions which correspond to the iris portion of the human eye such that when the lenses are placed on a person's eye the lenses are capable of making the iris portion of the person's eye appear to be a striking olive green color.

BACKGROUND OF THE INVENTION

Over the years many attempts have been made to modify or change the appearance of color of one's eyes using colored contact lenses with varying degrees of success. Attempts to produce an opaque lens with a natural appearance are disclosed in. U.S. Pat. Nos. 3,536,386, (Spivak); 3,679,504 (Wichterle); 3,712,718 (LeGrand), 4,460,523 (Neefe), 4,719,657 (Bawa), 4,744,647, (Meshel et al.), 4,634,449 (Jenkins); European Patent Publication No. 0 309 154 (Allergan) and U.K. Patent Application No. 2 202 540 A (IGEL).

Commercial success was achieved by the colored contact lens described in Knapp (in U.S. Pat. No. 4,582,402) which discloses a contact lens having, in its preferred embodiment, colored, opaque dots. The Knapp lens provides a natural appearance with a lens that is simple and inexpensive to produce, using a simple one-color printed dot pattern. Although, in Knapp, the intermittent pattern of dots does not fully cover the iris, the invention provides a sufficient density of dots that a masking effect gives the appearance of a continuous color when viewed by an ordinary observer. Knapp also discloses that the printing step may be repeated one or more-times using different patterns in different colors, since upon close examination the iris's of many persons are found to contain more than one color. The printed pattern need not be absolutely uniform, allowing for the change or modification of the appearance of the fine structure of the iris. The one-color Knapp lenses currently achieving commercial success have their dots arranged in an irregular pattern to enhance the structure of the iris. However, neither the Knapp commercial lenses, nor the Knapp patent disclose or suggest a contact lens in which the color and design combine to change a person's eyes to a striking olive green color.

Other attempts to create a more natural appearing lens include U.S. Pat. No. 5,120,121 to Rawlings which discloses a cluster of interconnecting lines radiating from the periphery of the pupil portion to the periphery of the iris portion. Further, European Patent No. 0 472 496 A2 shows a contact lens having a pattern of lines that attempts to replicate the lines found in the iris.

Although many attempts have been made to create colored contact lenses that change or modify the appearance of color of the iris, none of the colored contact lenses have addressed changing or modifying the appearance of the contact wearer's eyes so that they appear to be a natural, striking, olive green color.

SUMMARY OF THE INVENTION

The present invention is based on the surprising discovery that a particular colored, opaque contact lens can achieve a natural appearing, striking olive green color appearance for a person wearing the lens. The improvement in appearance over existing lenses using different colors of existing patterns and different patterns altogether is startling. Unlike previous color lenses, the lenses of this invention are able to cause changes or modifications the appearance of the color of the contact lens wearer's iris to make them appear to be a striking olive green color.

One objective of the invention is to provide a colored contact lens with a non-opaque pupil section, an iris section surrounding said pupil section, and a colored, opaque intermittent pattern over said entire iris section, the elements of said pattern being indiscernible to the ordinary viewer, wherein the elements of said pattern are of a color which provides a lens capable of making changes or modifications to the appearance of the color of the iris of the person wearing the lens to a striking olive green color, while still imparting a very natural appearance.

Another objective of the invention is to provide a colored contact lens with a non-opaque pupil section, an iris section surrounding said pupil section, and a colored, opaque intermittent pattern over the iris section, that leaves a substantial portion within the interstices of the pattern non-opaque, said pattern covering at least about 25 percent of the area of said iris section, the elements of said pattern being indiscernible to the ordinary viewer, wherein the intermittent pattern may be uniform or non-uniform dots, wherein the elements of said pattern are of a color which provides a lens capable of making changes or modifications to the appearance of the color of the iris of the person wearing the lens to a striking olive green color, while still imparting a very natural appearance.

Another objective of the invention is to provide a colored contact lens with a non-opaque pupil section, an iris section surrounding said pupil section, and a colored, opaque intermittent pattern over the iris section, that leaves a substantial portion within the interstices of the pattern non-opaque, said pattern covering at least about 25 percent of the area of said iris section, the elements of said pattern being indiscernible to the ordinary viewer, wherein the intermittent pattern is a starburst pattern having fewer dots at the outer and inner periphery of the iris section. Thus, a lens capable of making changes or modifications to the appearance of the color of the iris of the person wearing the lens to a striking olive green color, while still imparting a very natural appearance is provided.

Another objective of the invention is to provide printing methods for manufacturing the above-described and similar contact lenses.

The term "non-opaque" as used herein is intended to describe a part of the lens that is uncolored or colored with translucent coloring.

The term "ordinary viewer" is intended to mean a person having normal 20—20 vision standing about 5 feet from a person wearing the lenses of this invention.

DETAILED DESCRIPTION OF THE PREFERRED EMBODIMENTS

Figure 1:
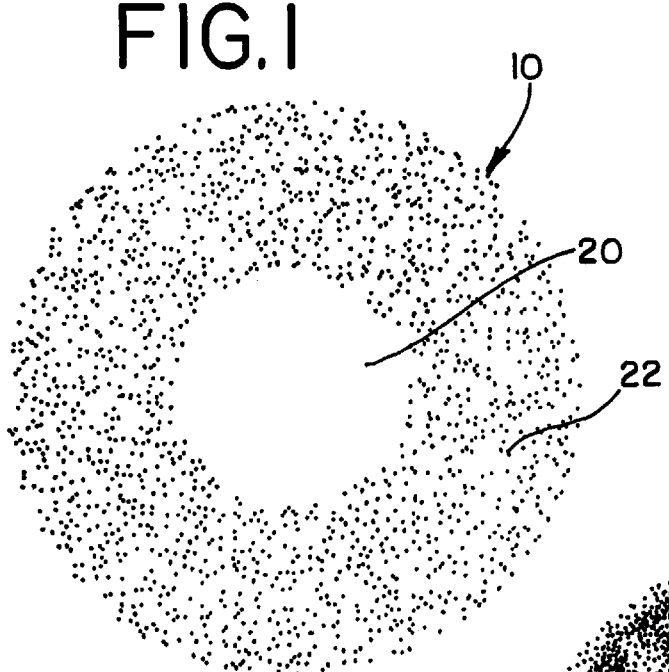
FIG. 1 illustrates a contact lens pattern in accordance with the present invention.

FIG. 1 shows a contact lens 10 in accordance with the present invention. It has a non-opaque pupil section 20 in the center of lens. This pupil section corresponds to the pupil section of the human eye such that when the contact lens is placed on the eye, the pupil section of the contact lens will come in contact with the pupil of the eye. The contact lens 10 also has an annular iris section 22 surrounding the pupil section. This iris section 22 corresponds to the iris section of the human eye, such that when the contact lens 10 is placed in contact with the human eye, the iris section 22 will cover the iris section of the eye. For hydrophilic lenses a peripheral section (not shown) surrounds the iris section 22. A colored, opaque, intermittent pattern is located over the entire iris section 22, as show in FIG. 1. The pattern leaves a substantial portion of the iris section of the pattern non-opaque. The non-opaque areas of the iris section 22 appear white in FIG. 1, and appears clear or non-opaque on the actual contact lens.

The elements of the pattern are preferably dots, and especially preferred are dots, as shown in FIG. 1. Certain portions of the iris section 22 may be less densely covered with dots than other portions. This arrangement changes or modifies the appearance of the structure of the iris of a person wearing the lens.

The opaque pattern may be comprised of dots having any shape, regular or irregular, such as round, square, hexagonal, elongated, etc. Further, the elements of the pattern may have a shape other than dots, so long as the elements are indiscernible to the ordinary viewer, cover at least about 25 percent of the iris, and leave a substantial portion of the iris section within the interstices of the pattern non-opaque.

The improvement of this invention is a color contact lens that surprisingly changes or modifies the appearance of the iris of a person wearing the lens to a striking olive green color, while providing a natural appearance. To produce this color according to the preferred embodiment, an ink paste made up of green and yellow colorant is combined in such a manner such that when the ink is applied to the contact lens in one of many different patterns, and the lens is placed on the eye, the iris of the person wearing the lens will have a striking olive green appearance.

The colorants necessary to produce the striking olive green appearance in the preferred embodiment is made using ethyl lactate, a binder solution, PCN green and hydrophobic iron oxide in the following approximate percentages (by weight): ethyl lactate 30%; binder solution 62%; PCN green 0.15% and hydrophobic iron oxide 7.85%. Different percentages of these (and other) ingredients may be used and still obtain the striking olive green color. At least about a +/−10% range may be employed.

Alternatively, chromium oxide can be used instead of PCN green with the appropriate balance of ingredients. A common binder or binding polymer solution that can be used is disclosed in U.S. Pat. No. 4,963,159 to Narducy et al. The target viscosity is approximately 50,000 CPS. Although these approximate ranges are utilized to establish the preferred color ink, variations of these and other ingredients may be utilized which, when printed on a contact lens, provide the same effect as the present invention described herein. Further, pigment percentages or loads may be increased or decreased depending on the preference with corresponding adjustment made to the binder and ethyl lactate percentages to adjust for viscosity.

In order to manufacture the colorant, the ingredients (except for the binder solution) are placed in a ceramic jar along with a grinding media to make the paste. In this case the grinding media consists of ceramic balls having a total weight approximately equal to the weight of the ingredients being used. The ceramic jar is then placed on its side and rolled for between about 26 and 72 hours at approximately 35 to 50 revolutions per minute. A standard machine used for rolling the ingredients is the three tier mill jar manufactured by Cole-Parmer (catalog number 04149-30). The paste is then mixed with the binder solution to make the ink or colorant.

If the target weight of the colorant is 650 grams, then the target weight of the ethyl lactate should be approximately 195 grams, the binder solution should be approximately 403 grams, the PCN green should be approximately 0.98 grams, and the hydrophobic iron oxide should be approximately 51.02 grams.

If, on the other hand, the target weight of the colorant is 3000 grams, then the target weight of the ethyl lactate should be approximately 900 grams, the binder solution should be approximately 1860 grams, the PCN green should be approximately 4.5 grams, and the hydrophobic iron oxide should be approximately 235.5 grams.

As described below, once the colorant is formed, it may be printed onto a contact lens in many different ways, and in many different patterns. The preferred pattern for which the colorant is printed onto a contact lens is using elements of color such as dots as shown in FIG. 1, and as first describe by Knapp in U.S. Pat. Nos. 4,582,402; 4,704,017; and 4,720,188. The dots may or may not be uniform, and may or may not run together to form islands of color. In fact, the elements of color do not have to be dots, as long as the elements are indiscernible to the ordinary viewer, cover at least about 25 percent of the iris, and leave a substantial portion of the iris section non-opaque.

Figure 2:
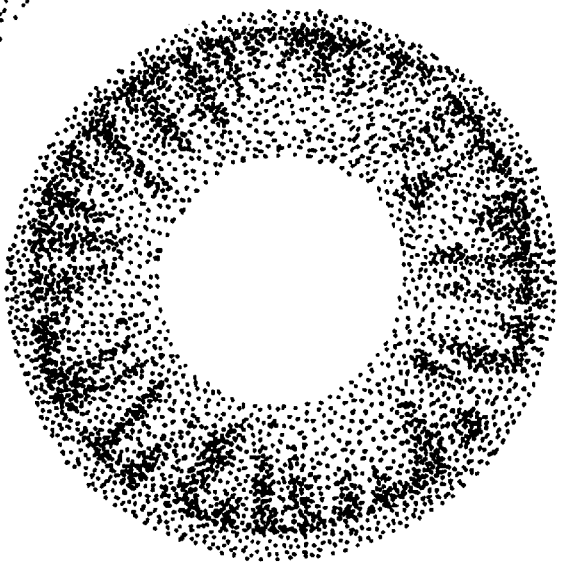
FIG. 2 illustrates a contact lens pattern in accordance with an alternative embodiment of the present invention.

An alternative pattern is shown in FIG. 2. The pattern shown in FIG. 2 consists of a starburst pattern having fewer dots at the outer and inner periphery of the iris section. Other patterns may be utilized with the inks described herein to accomplish the present invention.

Each of the above described patterns, when printed on a contact lens using the above described olive green colorant, provides a lens capable of making a change or modification of the appearance of the iris to a striking olive green for the person wearing the lens.

The colorant described above has certain characteristics when measured spectrophotometrically. Such measurements can be taken, for example, by a measuring instrument such as a Macbeth Color-Eye 3000. The measurements of the preferred embodiment took place under illuminant D65, 10 degrees observer, with the specular component included.

Although there are different measurements that can be taken, two of the most widely known are the Munsell System of Color Notation and the International Commission on Illumination or the CIE Color Notation System.

The observed color of a surface depends on the spectral quality of the illumination, the direction of illumination, the direction of viewing, the surround or background, the nature of any light that might be reflected from the surface and the nature and state of adaptation of the eyes of the observer. The standard viewing condition would be to view a specimen illuminated by daylight from a lightly overcast north sky (south sky in the southern hemisphere) or the artificial equivalent of this illumination, a D65 daylight source. Viewing booths that provide controlled artificial daylight and other common illuminants, such as the SpectraLight® II, and Sol Source, are available from Gretag Macbeth. Their use is recommended because the light is much more reproducible than natural daylight, they provide standard viewing conditions at any hour and in interior rooms, they provide a neutral ambient surround and they exclude extraneous light. Specimens should be viewed along their normal (the line of sight perpendicular to the surface) and illuminated at 45 degrees to the normal. Equivalent results can be obtained with the reversed geometric arrangement, i.e., illuminating normally and viewing at 45 degrees. These conditions are described in a standard from the American Society for Testing and Materials (ASTM): D 1729 Standard Practice for Visual Evaluation of Color Differences of Opaque Materials.

By using the Munsell System of Color Notation, one can precisely specify colors and show the relationships among colors. Every color has three qualities or attributes: hue, value and chroma. Munsell established numerical scales with visually uniform steps for each of these attributes. The Munsell Book of Color displays a collection of colored chips arranged according to these scales. Each chip is identified numerically using these scales. The color of any surface can be identified by its hue, value and chroma. These attributes are given the symbols H, V, and C and are written in a form H V/C, which is called the Munsell notation. Utilizing Munsell notations, each color has a logical relationship to all other colors. This opens up endless creative possibilities in color choices, as well as the ability to communicate those color choices precisely.

Figure 3:
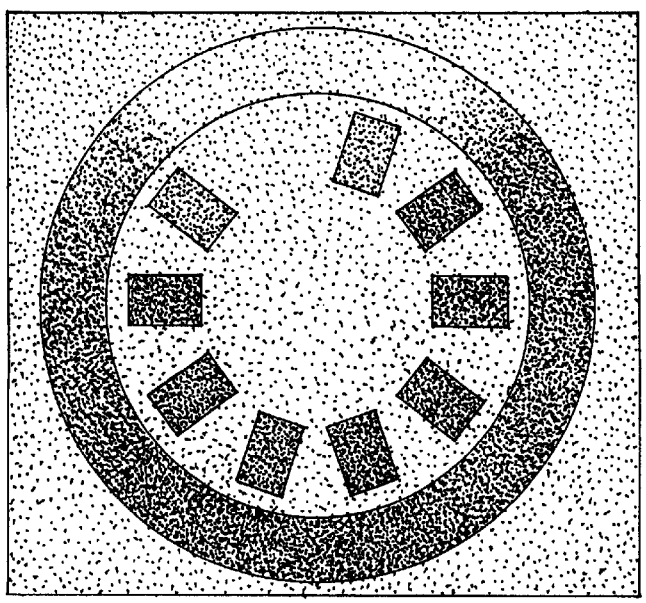
FIG. 3 illustrates a black and white version of the Munsell Hue diagram in accordance with the Munsell System of Color Notation.

The first attribute, hue, is that of a color by which we distinguish red from green, blue from yellow, etc. There is a natural order of hues: red, yellow, green, blue, purple. One can mix paints of adjacent colors in this series and obtain a continuous variation from one color to the other. For example, red and yellow may be mixed in any proportion to obtain all the hues from red through orange to yellow. The same may be said of yellow and green, green and blue, blue and purple, and purple and red. This series returns to the starting point, so it can be arranged in a circle, as shown in FIG. 3 (the color version of FIG. 3 can be located in the Munsell Book of Color). Red, yellow, green, blue, and purple, the principal hues, are placed at equal intervals around the Munsell circle. Five intermediate hues: yellow-red, green-yellow, blue-green, purple-blue and red-purple, make ten hues in all. For simplicity, initials are used to designate the ten hue sectors: R, YR, Y, GY, G, BG, B, PB, P and RP.

Figure 4:
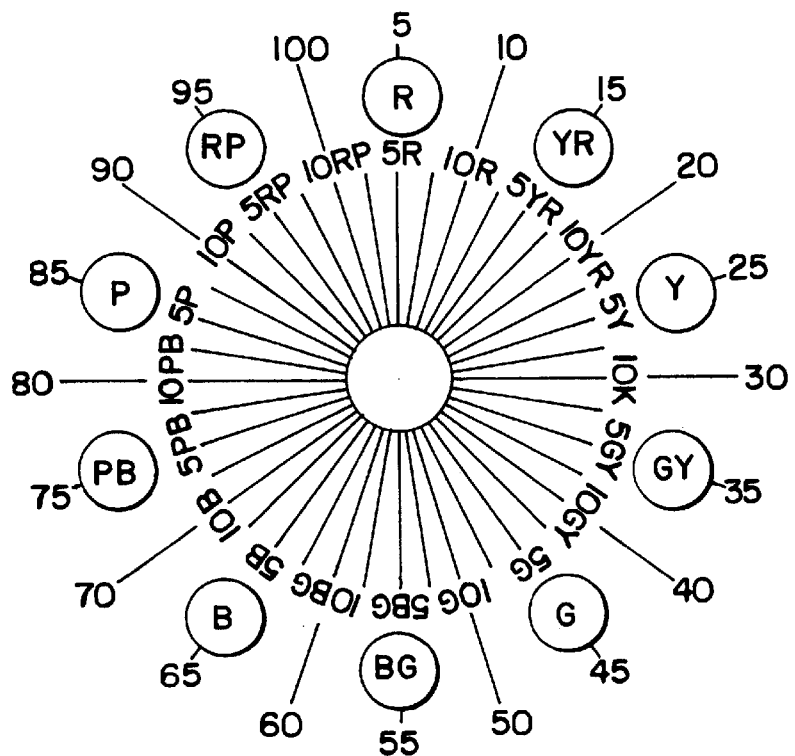
FIG. 4 illustrates a black and white version of the Munsell Hue Designations in accordance with the Munsell System of Color Notation.

As shown in FIG. 4, the hue circle is arbitrarily divided into 100 steps, of equal visual change in hue, with the zero point at the beginning of the red sector. Hue may be identified by a number from 0 to 100, as shown in the outer circle. This may be useful for statistical records, cataloging and computer programming. However, the meaning is more obvious when the hue is identified by the hue sector and a step, based on a scale of ten, within that sector. For example, the hue in the middle of the red sector is called five red, and is written 5R. (The zero step is not used, so there is a 10R hue, but no 0 YR.) This method of identifying hue is shown on the inner circle of FIG. 4.

The second attribute, value, indicates the lightness of a color. The scale of value ranges from 0 for pure black to 10 for pure white. Black, white and the grays between them are called neutral colors. They have no hue. Colors that have a hue called chromatic colors. The value scale applies to chromatic as well as neutral colors.

The third attribute, chroma, is the degree of departure of a color from the neutral color of the same value. Color of low chroma are sometimes called weak, while those of high chroma are said to be highly saturated, strong or vivid. The scaling of chroma is intended to be visually uniform and is very nearly so. The units are arbitrary. The scale starts at zero, for neutral colors, but there is no arbitrary end to the scale. As new pigments have become available, Munsell color chips of higher chroma have been made for many hues and values. The chroma scale for normal reflecting materials extends beyond 20 in some cases. Fluorescent materials may have chromas as high as 30.

The complete Munsell notation for a chromatic color is written symbolically: H V/C. For a vivid red having a hue of 5R, a value of 6 and chroma of 14, the complete notation is 5R 6/14. When a finer division is needed for any of the attributes, decimals are used. For example, 5.3R 6.1/14.4.

The notation for a neutral color is written: N V/. (The chroma of a neutral color is zero, but it is customary to omit the zero in the notation.) The notation N 1/denotes a black, a very dark neutral, while N 9/denotes a white, a very light neutral. The notation for a middle gray is N 5/.

The present invention consists of an olive green colorant to be printed on a contact lens. The hue, when measured under the Munsell System of Color Notation, ranges from 0.68 to 0.92, with the preferred hue being 0.8 GY. The value, under the Munsell system, ranges from 4.06 to 5.50, with the preferred value being 4.78. The chroma, when measured under the Munsell system, ranges from 4.9 to 6.7, with the preferred chroma being 5.8.

The CIE Color Notation System, another way in which to measure color, is a colorimetric specification system based on stimulus-response characteristics adopted by the CIE in 1931. The current recommendations for the system may be obtained from the official publication, CIE Publication No. 15 (E-1.3.1) 1971, Colorimetry Official Recommendation of the International Commission on Illumination available from the National Bureau of Standards, Wash., D.C. 20234.

The CIE Standard Observer is the observer data adopted by the CIE to represent the response of the average human eye, when light-adapted, to an equal energy spectrum. Unless otherwise specified, the term applies to the data adopted in 1931 for a 2 degree field of vision. The data adopted in 1964, sometimes called the 1964 observer, were obtained for a 10 degree, annular field which excludes the 2 degree field of the 1931 observer functions.

The colorant in the present invention can be measured spectrophotometrically. In accordance with the CIE method of measurement, and in particular the CIE 1976 Color Difference Equation:

$$\Delta E_{CIE}(L*, a*, b*) = [(\Delta L*)^2 + (\Delta a*)^2 + (\Delta b*)^2]^{1/2}$$

$$\text{where} \quad L* = 25\left(\frac{100Y}{Y_0}\right)^{1/3} - 16 \quad (1 < Y < 100)$$

$$a* = 500\left[\left(\frac{X}{X_0}\right)^{1/3} - \left(\frac{Y}{Y_0}\right)^{1/3}\right]$$

$$b* = 200\left[\left(\frac{Y}{Y_0}\right)^{1/3} - \left(\frac{Z}{Z_0}\right)^{1/3}\right]P$$

X, Y and Z are the tristimulus values of the sample. Xo, Yo, and Zo define the color of the nominally white object color stimulus (the illuminant). ΔL=L* for the sample, −L* for the standard; Δa=a* for the sample, −a* for the standard; −b=b* for the sample, −b* for the standard.

Figure 5:
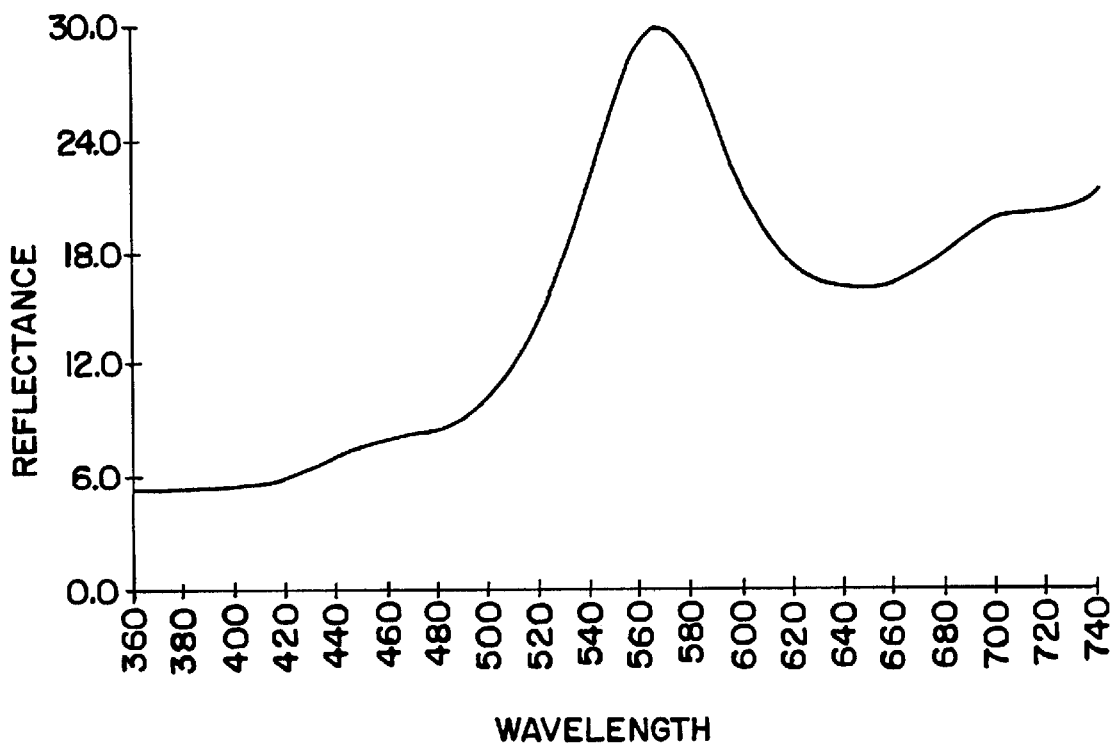
FIG. 5 illustrates a graph of reflectance versus wavelength of the colorant used in the present invention in accordance with the CIE Color Notation System.

Two panels containing the colorant of the present invention were measured spectrophotometrically in accordance with the CIE Color Notation System, using a standard of olive-gold #1133-67. The olive-gold standard is 52.160 for L*, −3.384 for a*, and 32.585 for b*. L* for panel #1 was measured to be 52.142, while a* and b* measured −3.365 and 32.564 respectively. ΔL measured at −0.018, Δa* measured at 0.019, Δb* measured at −0.021, and ΔE was 0.034. On the panel #2, L* was measured to be 52.018, while a* and b* measured −3.265 and 32.592 respectively. ΔL measured at −0.142, Δa* measured at 0.118, Δb* measured at 0.006, and ΔE was 0.185. FIG. 5 shows the graph of the spectrophotometric measurements of panel #1, in which reflectance is graphed against wavelength. FIG. 5 shows a reflectance beginning at about 500 nanometers and peaking at about 560 nanometers at about 30 reflective units, and then back down at about 620 nanometers.

Producing the opaque portions of the iris section is preferably accomplished by printing the lens using the known printing process of U.S. Pat. No. 4,582,402 to Knapp, incorporated herein by reference, and the known printing process of U.S. Pat. No. 5,034,116 and 5,116,112 to Rawlings, incorporated herein by reference. Generally, a plate or cliche having depressions in the desired pattern is smeared with ink of the desired shade. Excess ink is removed by scrapping the surface of the plate with a doctor blade leaving the depression filled with ink. A silicon rubber pad is pressed against the plate to pick up the ink from the depressions and then is pressed against a surface of the lens to transfer the pattern to the lens. The printed pattern is then cured to adhere it to the lens. Of course, either the anterior or posterior surfaces of the lens may be printed, but printing the anterior surface is presently preferred.

The process of the present invention for making colored contact lenses is as follows. A transparent contact lens comprising at least a pupil section and an iris section surrounding the pupil section is provided.

If the lens is constructed of a hydrophilic material, it also has a peripheral section surrounding iris section. For hydrophilic material, the steps described below are performed with the material in an unhydrated state. Preferred hydrophilic materials are disclosed by Loshaek in U.S. Pat. No. 4,405,773, incorporated herein by reference.

The colored pattern may be deposited onto iris section of the lens in any manner. The currently preferred method is by offset pad printing, described below in some detail.

A plate (not shown) is prepared having flat surface and circular depressions corresponding to the desired dot pattern. To make the pattern of the preferred embodiment each depression should have a diameter of about 0.1 mm, and a depth of about 0.013 mm. The depressions are arranged to cover an annular shape corresponding to that of the iris section of the lens.

The plate may be made by a technique that is well known for making integrated analog or digital circuits. First a pattern about 20 times as large as the desired pattern is prepared. Next the pattern is reduced using well known photographic techniques to a pattern of the exact desired size having the portion to be colored darker than the remaining area. A flat surface is covered by a photo resist material which becomes water insoluble when exposed to light. The photo resist material is covered with the pattern and exposed to light. The portion of the photo resist pattern not expose to light is removed by washing with water and the resulting plate is etched to the required depth. Then the remainder of the photo resist material is mechanically removed.

Colorant in accordance with the present invention is deposited on a flat surface of the plate and scraped across the pattern with a doctor blade. This causes depressions to be filled with ink while removing excess ink from flat surface.

A pad made of silicon rubber, impregnated with silicon oil for easy release, is pressed against the pattern, removing ink from depressions, The ink on the pad is allowed to dry slightly to improve tackiness, then pressed against the front surface of the contact lens, depositing the ink in the desired pattern over the iris section. Of course the pad must have enough flexibility to deform to fit over the convex front surface of the lens. The printed pattern need not be absolutely uniform, allowing for the change or modification of the appearance of the fine structure of the iris.

Next the deposited pattern is treated to render it resistant to removal from the lens under exposure to the ocular fluids that the lens will encounter when placed in the eye. The exact method of preventing removal depends on the material of construction of the lens and the pattern. Mere air drying or heating the lens may suffice. For hydrophilic lenses, the techniques for coating the opaque pattern described in Wichterle, U.S. Pat. No. 3,679,504 (incorporated herein by reference), may be used.

The method for manufacturing a colored contact lens in accordance with the present invention generally includes the steps of applying a portion of colorant in accordance with the present invention to the surface of a transparent contact lens and rendering the colorant resistant to removal from ocular fluids. The printed contact lens will have a non-opaque pupil section and an iris section surrounding said pupil section with the colorant of the present invention.

It can be seen that the present invention provides a contact lens capable of changing or modifying the appearance of the color of the iris to a striking, olive green color, while allowing visualization of the fine structure thereof and providing a natural appearance. Various changes may be made in the function and arrangement of parts: equivalent means may be substituted for those illustrated and described; and certain features may be used independently from others without departing from the spirit and scope of the invention as defined in the following claims.

I claim:

1. A colored contact lens intended to be worn by a person in order to change the appearance of a human iris to an olive green color, the contact lens comprising a non-opaque pupil section, an iris section surrounding said pupil section, and a colored, opaque intermittent pattern over said iris section that leaves a substantial portion of the pattern non-opaque, said pattern covering at least about 25% of the area of said iris section, the elements of said pattern being indiscernible to the ordinary viewer, said pattern being made up of elements of green and yellow colorant, wherein when said contact lens is placed on the human eye, the iris appears to have an olive green color.

2. The colored contact lens in accordance with claim 1 wherein the green colorant comprises ingredients selected from the group consisting of chromium oxide and PCN green and the yellow colorant comprises hydrophobic iron oxide.

3. The colored contact lens in accordance with claim 2 wherein the green and yellow colorant comprises an ink paste of about 7.85 percent hydrophobic iron oxide by weight, and about 0.15 percent PCN green by weight.

4. The colored contact lens in accordance with claim 3 wherein the contact lens when placed on a human eye, changes the appearance of the iris of the person wearing the contact lens from a color selected from the group consisting of brown, blue, green, hazel, or grey, to an iris appearing to have an olive green color.

5. The colored contact lens in accordance with claim 1 wherein the contact lens when measured under the Munsell Color System comprises a hue of about 0.8 GY, a value of about 4.78, and a chroma of about 5.8.

6. The colored contact lens in accordance with claim 1 wherein the contact lens when measured under the CIE Color Notation System comprises a L* of about 52.160, an a* of about −3.384, and a b* of about 32.585.

7. The colored contact lens in accordance with claim 1 wherein the contact lens when measured spectrophotometrically comprises a non-standard reflectance between about 520 and 600 nanometers, in which the reflectance rises to about 30.0 reflective units at a wavelength of apporximately 560 nanometers.

8. The colored contact lens in accordance with claim 1 wherein the intermittent pattern comprises dots.

9. The colored contact lens in accordance with claim 8 wherein the intermittent pattern is not uniform.

10. The colored contact lens in accordance with claim 9 wherein the non-opaque iris portion is uncolored.

11. The colored contact lens in accordance with claim 9 wherein the non-opaque iris portion is translucently colored.

12. The colored contact lens in accordance with any one of claims 1–11 wherein said colored contact lens is hydrophilic.

13. A colored contact lens intended to be worn by a person in order to change the appearance of a human iris to an olive green color, the contact lens comprising a non-opaque pupil section, an iris section surrounding said pupil section, and a colored, opaque intermittent pattern over said iris section that leaves a substantial portion of the pattern non-opaque, said pattern covering at least about 25% of the area of said iris section, the elements of said pattern being indiscernible to the ordinary viewer, said pattern being made up of elements of green and yellow colorant, such that when the colorant is measured spectrophotometrically and graphed as wavelength versus reflectance, the graph displays a rise in the reflectance between about 520 and about 600 nanometers, in which the reflectance rises from about 12 reflective units at a wavelength of about 520 nanometers, to about 30 reflective units at a wavelength of about 560 nanometers, and back down to about 15 reflective units at a wavelength of about 600 nanometers, wherein when said contact lens is placed on the human eye, the iris appears to have an olive green color.

14. The colored contact lens in accordance with claim 13 wherein the green colorant comprises ingredients selected from the group consisting of chromium oxide and PCN green and the yellow colorant comprises hydrophobic iron oxide.

15. The colored contact lens in accordance with claim 14 wherein the green and yellow colorant comprises an ink paste of about 7.85 percent hydrophobic iron oxide by weight, and about 0.15 percent PCN green by weight.

16. The colored contact lens in accordance with claim 15 wherein the contact lens when placed on a human eye, changes the appearance of the iris of the person wearing the contact lens from a color selected from the group consisting of brown, blue, green, hazel, or grey, to an iris appearing to have an olive green color.

17. The colored contact lens in accordance with claim 13 wherein the contact lens when measured under the Munsell color order system comprises a hue of about 0.8 GY, a value of about 4.78, and a chroma of about 5.8.

18. The colored contact lens in accordance with claim 13 wherein the contact lens when measured under the CIE Color Notation System comprises a L* of about 52.160, an a* of about −3.384, and a b* of about 32.585.

19. The colored contact lens in accordance with claim 13 wherein the intermittent pattern comprises dots.

20. The colored contact lens in accordance with claim 19 wherein the intermittent pattern is not uniform.

21. The colored contact lens in accordance with claim 20 wherein the non-opaque iris portion is uncolored.

22. The colored contact lens in accordance with claim 20 wherein the non-opaque iris portion is translucently colored.

23. The colored contact lens in accordance with any one of claims 13–22 wherein said colored contact lens is hydrophilic.

24. A method for manufacturing a colored contact lens intended to be worn by a person in order to change the appearance of a human iris to an olive green color, said contact lens comprising a non-opaque pupil section, an iris section surrounding said pupil section, and a colored, opaque intermittent pattern over said iris section that leaves a substantial portion of the pattern non-opaque, said pattern covering at least about 25% of the area of said iris section, the elements of said pattern being indiscernible to the ordinary viewer, said pattern being made up of elements of green and yellow colorant, wherein when said contact lens is placed on the human eye, the iris appears to have an olive green color, the method of manufacturing said contact lens comprising the steps of:

a) providing a plate having depressions corresponding to the intermittent pattern over said iris section;

b) filling the depressions with green and yellow colorant, said colorant having such characteristics that when the colorant is measured spectrophotometrically and graphed as wavelength versus reflectance, the graph displays a reflectance between about 520 and about 600 nanometers, in which the reflectance rises from about 12 reflective units at a wavelength of about 520 nanometers, to about 30 reflective units at a wavelength of about 560 nanometers, and back down to about 15 reflective units at a wavelength of about 600 nanometers;

c) pressing a flexible pad against the plate;

d) pressing the flexible pad against a surface of the contact lens thereby printing the pattern on the contact lens;

e) rendering the colorant resistant to removal from ocular fluids.

25. The colored contact lens in accordance with claim 24 wherein the green colorant comprises ingredients selected from the group consisting of chromium oxide and PCN green and the yellow colorant comprises hydrophobic iron oxide.

26. The colored contact lens in accordance with claim 25 wherein the contact lens when placed on a human eye, changes the appearance of the iris of the person wearing the contact lens from a color selected from the group consisting of brown, blue, green, hazel, or grey, to an iris appearing to have an olive green color.

27. The colored contact lens in accordance with claim 26 wherein the green and yellow colorant comprises an ink paste of about 7.85 percent hydrophobic iron oxide by weight, and about 0.15 percent PCN green by weight.

28. The colored contact lens in accordance with claim 27 wherein the elements of colorant are dots.

29. The colored contact lens in accordance with claim 28 wherein the elements of colorant are not uniform.

30. The colored contact lens in accordance with claim 29 wherein the non-opaque iris portion is uncolored.

31. The colored contact lens in accordance with claim 29 wherein the non-opaque iris portion is translucently colored.

32. The colored contact lens in accordance with any one of claims 24–31 wherein said colored contact lens is hydrophilic.

33. A method for changing the appearance of the color of the human iris to an olive green color using a contact lens having a non-opaque pupil section, an iris section surrounding said pupil section, and a colored, opaque intermittent pattern over said iris section that leaves a substantial portion of the pattern non-opaque, said pattern covering at least about 25% of the area of said iris section, the elements of said pattern being indiscernible to the ordinary viewer, said pattern being made up of elements of green and yellow colorant, the method of changing said appearance of color of the human iris to an olive green color comprising the steps of:

a) providing a contact lens having a pattern being made up of elements of green and yellow colorant, said colorant having such characteristics that when the colorant is measured spectrophotometrically and graphed as wavelength versus reflectance, the graph displays a reflectance between about 520 and about 600 nanometers, in which the reflectance rises from about 12 reflective units at a wavelength of about 520 nanometers, to about 30 reflective units at a wavelength of about 560 nanometers, and back down to about 15 reflective units at a wavelength of about 600 nanometers;

b) placing said contact lens on a human eye, thereby changing the appearance of the iris of said eye to an olive green color.

34. The colored contact lens in accordance with claim 33 wherein the green colorant comprises ingredients selected from the group consisting of chromium oxide and PCN green and the yellow colorant comprises hydrophobic iron oxide.

35. The colored contact lens in accordance with claim 34 wherein the contact lens when placed on a human eye, changes the appearance of the iris of the person wearing the contact lens from a color selected from the group consisting of brown, blue, green, hazel, or grey, to an iris appearing to have an olive green color.

36. The colored contact lens in accordance with claim 35 wherein the green and yellow colorant comprises an ink paste of about 7.85 percent hydrophobic iron oxide by weight, and about 0.15 percent PCN green by weight.

37. The colored contact lens in accordance with claim 36 wherein the elements of colorant are dots.

38. The colored contact lens in accordance with claim 37 wherein the elements of colorant are not uniform.

39. The colored contact lens in accordance with claim 38 wherein the non-opaque iris portion is uncolored.

40. The colored contact lens in accordance with claim 38 wherein the non-opaque iris portion is translucently colored.

41. The colored contact lens in accordance with any one of claims 33–40 wherein said colored contact lens is hydrophilic.

* * * * *

UNITED STATES PATENT AND TRADEMARK OFFICE
CERTIFICATE OF CORRECTION

| | | |
|---|---|---|
| PATENT NO. | : 6,030,078 | |
| APPLICATION NO. | : 09/148185 | |
| DATED | : February 29, 2000 | |
| INVENTOR(S) | : Gerardo Ocampo | |

It is certified that error appears in the above-identified patent and that said Letters Patent is hereby corrected as shown below:

On the Title Page Item (57)

In column 2, line 3, under "ABSTRACT", delete "patter" and substitute --pattern-- in its place.

In column 2, line 4, under "ABSTRACT", delete "having" and substitute --has-- in its place.

In column 2, line 5, under "ABSTRACT", insert --of-- after "are".

In the Claims

Column 9, line 5, delete "or" and substitute --and-- in its place.

Line 9, delete "Color System" and substitute --System of Color Notation-- in its place.

Column 9, line 18, delete "apporximately" and substitute --approximately-- in its place.

Column 9, line 64, delete "or" and substitute --and-- in its place.

Column 10, line 1, delete "color order system" and substitute --System of Color Notation-- in its place.

In Column 10, line 46, after "plate" insert --thereby transferring colorant to the pad--.

In Column 10, line 49, after "colorant" insert --on the contact lens--.

In Column 10, line 51, before "colored" insert --method for manufacturing a--.

In Column 10, line 56, before "colored" insert --method for manufacturing a--.

In Column 10, line 60, delete "or" and substitute --and-- in its place.

In Column 10, line 62, before "colored" insert --method for manufacturing a--.

In Column 10, line 66, before "colored" insert --method for manufacturing a--.

UNITED STATES PATENT AND TRADEMARK OFFICE
CERTIFICATE OF CORRECTION

PATENT NO.       : 6,030,078
APPLICATION NO.  : 09/148185
DATED            : February 29, 2000
INVENTOR(S)      : Gerardo Ocampo It is certified that error appears in the above-identified patent and that said Letters Patent is hereby corrected as shown below:

In the Claims (cont'd)

In Column 11, line 1, before "colored" insert --method for manufacturing a--.

In Column 11, line 3, before "colored" insert --method for manufacturing a--.

In Column 11, line 5, before "colored" insert --method for manufacturing a--.

In Column 11, line 7, before "colored" insert --method for manufacturing a--.

In Column 12, line 4, delete "colored contact lens" and substitute --method-- in its place.

In Column 12, line 9, delete "colored contact lens" and substitute --method-- in its place.

In Column 12, line 13, delete "or" and substitute --and-- in its place.

In Column 12, line 15, delete "colored contact lens" and substitute --method-- in its place.

In Column 12, line 20, delete "colored contact lens" and substitute --method-- in its place.

In Column 12, line 22, delete "colored contact lens" and substitute --method-- in its place.

In Column 12, line 24, delete "colored contact lens" and substitute --method-- in its place.

In Column 12, line 26, delete "colored contact lens" and substitute --method-- in its place.

UNITED STATES PATENT AND TRADEMARK OFFICE
CERTIFICATE OF CORRECTION

PATENT NO. : 6,030,078
APPLICATION NO. : 09/148185
DATED : February 29, 2000
INVENTOR(S) : Gerardo Ocampo It is certified that error appears in the above-identified patent and that said Letters Patent is hereby corrected as shown below:

In the Claims (cont'd)

In Column 12, line 28, delete "colored contact lens" and substitute --method-- in its place.

Signed and Sealed this

Fourth Day of September, 2007

JON W. DUDAS
*Director of the United States Patent and Trademark Office*